Sept. 9, 1952

T. H. THOMAS 2,609,899

CLUTCH CONTROL MECHANISM

Filed Dec. 23, 1948

INVENTOR.
THOMAS H. THOMAS
BY
H. O. Clayton
ATTORNEY

Patented Sept. 9, 1952

2,609,899

UNITED STATES PATENT OFFICE 2,609,899

CLUTCH CONTROL MECHANISM

Thomas H. Thomas, South Bend, Ind., assignor to Bendix Aviation Corporation, South Bend, Ind., a corporation of Delaware Application December 23, 1948, Serial No. 69,578

7 Claims. (Cl. 192—.07)

This invention relates in general to power means for operating the friction clutch of an automotive vehicle and in particular to pressure differential operated power means controlled by an operation of the accelerator of the vehicle and by an operation of the engine of the vehicle.

One of the principal objects of my invention is to provide a clutch control mechanism including a pressure differential operated motor controlled by valve mechanism including a three-way pressure balanced valve which is operative in accordance with the position of the accelerator and the vacuum of the intake manifold of the vehicle.

Another object of my invention is to provide, in the power plant of an automotive vehicle including a friction clutch and an accelerator, a vacuum operated clutch control mechanism comprising a single acting motor, said motor being controlled by a pressure balanced three-way valve which is actuated by the accelerator and a pressure differential and spring operated motor, the operation of the latter being controlled by the internal combustion engine of the vehicle or more particularly in accordance with the gaseous pressure of the intake manifold of said engine.

Yet another object of my invention is to provide power means for operating the friction clutch of an automotive vehicle said power means serving to effect two stages of clutch engaging movement of the driven element of the clutch as it moves into engagement with the driving element of the clutch said two stage operation of the clutch driven element being effected by a throttle opening movement of the accelerator and by engine speed controlled means.

Yet another object of my invention is to provide a clutch control mechanism adapted to be used in the power plant of an automotive vehicle, said mechanism including a pressure differential operated motor controlled by valve mechanism which is automatically operative to effect a clutch plate loading operation of the clutch control mechanism the degree of loading being dependent upon factors including the position of the accelerator and the speed of the engine of the vehicle, the mechanism being automatically operative to quickly increase the loading of the clutch plates when the engine speed is increased above its idling speed.

The principal object of my invention is to provide, in the power plant of an automotive vehicle including an internal combustion engine, a friction clutch and an accelerator, a vacuum operated clutch control mechanism comprising a single acting motor controlled by a pressure balanced three-way valve, said valve being actuated by the accelerator and a pressure differential and spring operated motor, the operation of the latter being controlled in accordance with the ability of the engine to deliver the power required for starting the automobile.

The above and other objects and features of the invention will appear more fully hereinafter from a consideration of the following description taken in connection with the accompanying drawings wherein two embodiments of the invention are illustrated by way of example.

Figure 1:
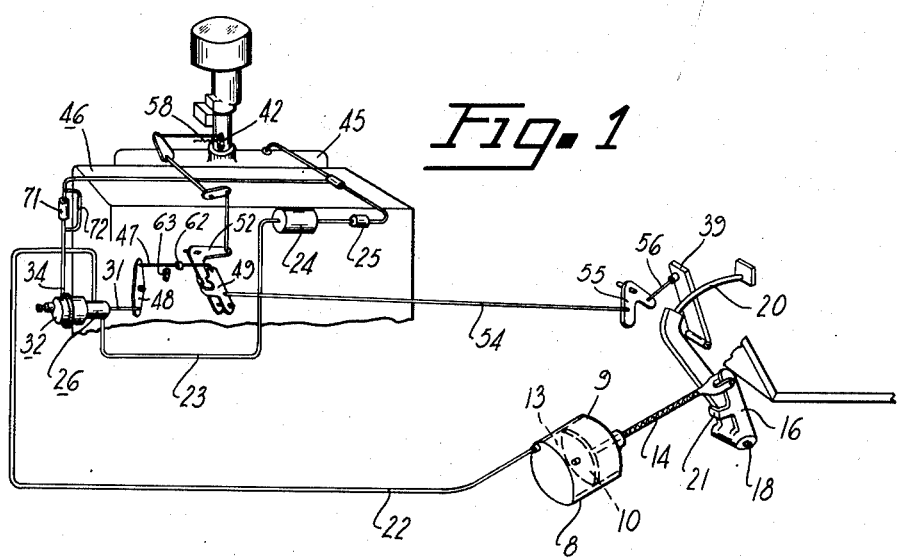
Figure 1 is a diagrammatic view disclosing the principal features of a preferred embodiment of my invention.

Describing now that embodiment of my invention disclosed in Figure 1 of the drawings, the principal elements thereof consist of a single acting vacuum motor 8 comprising a casing 9 and a power element such as a piston 10 which is connected to a friction clutch, not shown, of a conventional design. One end of the casing of the motor, a portion of the body thereof and the power element 10 together outline a control chamber 13, the gaseous pressure within said chamber being controlled to control the operation of the motor. The force transmitting means interconnecting the power element of the motor with the clutch preferably includes a flexible cable 14 connected to a crank 16; and said crank is fixedly connected to a shaft 18 which is connected to the clutch. A foot operated clutch pedal 20, contactable with a flange 21 extending from the crank 16, is also preferably included in the clutch operating mechanism. The connection between the pedal 20 and the crank 16 provides a means for effecting a manual operation of the clutch; and the lost motion connection between the pedal 20 and the crank 16 makes possible a power operation of the clutch without moving the clutch pedal.

Figure 2:
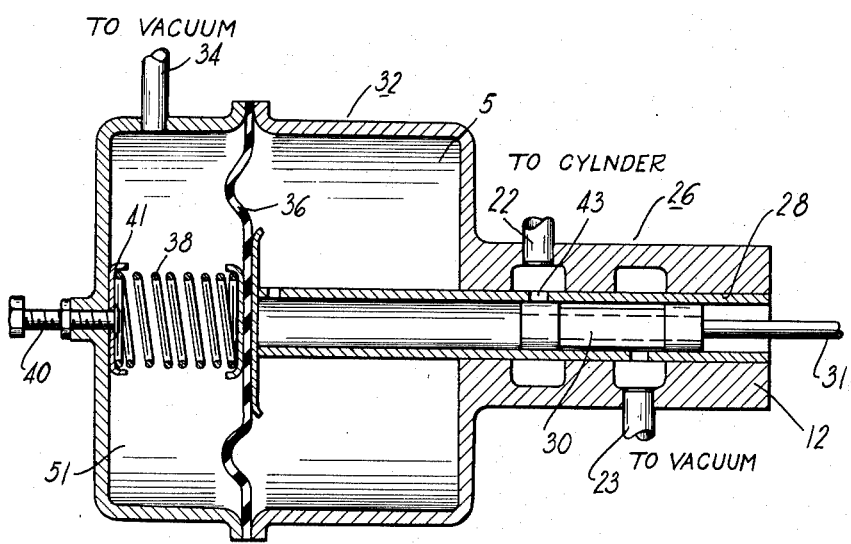
Figure 2 is a longitudinal sectional view of the control valve mechanism of my invention.

One end of the motor 8, that is the end of the same constituting a part of the aforementioned control chamber 13, is connected by a conduit 22 to a three-way control valve indicated as a whole by the reference numeral 26 and disclosed in detail in Figure 2; and a conduit 23 serves to connect this valve unit to a vacuum tank 24 which is connected to the intake manifold 45 of the internal combustion engine 46 of the vehicle. If desired the tank 24 may be omitted from the clutch control mechanism of my invention. A check valve 25 is preferably included in the latter connection said valve serving to maintain the tank evacuated despite the increases in gaseous pressure within the manifold 45. The casing 12 of the valve 26 is provided with a cylindrically shaped bore to receive a cylindrical sleeve valve member 28 constituting one of the two parts of the valve. A spool shaped valve member 30, which is bored to permit the passage of air therethrough, constitutes the other part of the two part three-way valve 26. The valve member 30 is connected to a rod 31 which is in turn connected to the accelerator 39 of the vehicle by linkage described hereinafter.

Figure 3:
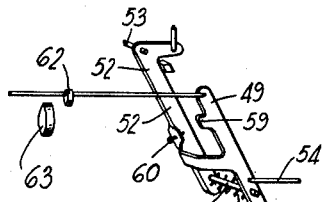
Figure 3 is a view disclosing the principal parts of the connection interconnecting the accelerator, the throttle and the control valve of the embodiment of my invention disclosed in Figure 1.

The casing 12 of the valve 26 is enlarged at one end to provide one part of a two-part pressure differential operated vacuum motor 32 the other part of said motor having connected thereto a conduit 34 which is connected to the intake manifold of the engine. The motor 32 includes a control compartment 51 and a compartment 5 which is vented to the atmosphere through the bore of the valve member 30. The sleeve valve member 28 is connected, at one of its ends, to a diaphragm 36 said member constituting the power element of the motor 32. A spring 38, interposed between the diaphragm 36 and one part of the casing of the motor 32, serves to bias the power element 36 and the valve member 28 connected thereto, to the right, Figure 2; and a set screw 40, and plate 41 connected thereto, serves as means for varying the tension, that is loading of the spring 38. The spool shaped valve member 30 is preferably connected to the accelerator by a lost motion type of linkage the principal parts of said linkage being disclosed in Figure 3 of the drawings. The accelerator is also connected to a crank 42 which serves to operate the throttle of the engine.

With the tank 24 incorporated in the connection between the intake manifold and valve the motor 8 is energized to disengage the clutch when the accelerator is released this operation being effected despite the fact that the engine is at the time dead; and upon cranking the engine the valve operating motor 32 is energized the valve member 28 being moved to the left, Figure 2, to lap the valve, that is cut off the connection between the tank 24 and the control compartment 13 of the clutch motor.

Describing now the force transmitting means interconnecting the accelerator 39 of the car with the throttle operating crank 42 and with the valve operating rod 31, said rod is connected to a rod 47 and this rod is pivotally connected with a lever member 48. The upper end of this lever member is connected to a lever member 49 and the lower end of the latter lever is pivotally mounted upon a floating pin 50, Figure 3. One end of this pin is mounted in one end of a bell crank lever 52 which is pivotally mounted upon a fixed pin 53. The lever member 49 is connected to the accelerator 39 by means of a rod 54, a bell crank lever 55 and a link 56 all as disclosed in Figure 1; and as disclosed in the latter figure, the bell crank lever 52 is connected to the throttle operating crank 42 by means of suitable force transmitting linkage. A spring 57, which is weaker than a throttle return spring 58, is operative, together with the spring 58, to return the accelerator to its throttle closed position and to move the valve member 30 to the left, Figure 2, to open the three-way valve 28, 30, that is operate the same to effect a clutch disengaging operation of the motor 10. The spring 57 is preferably sleeved over the pin 50 and is connected at its ends to the levers 49 and 52.

Continuing now the description of the clutch control operation of the motor 8, said motor having been energized to disengage the clutch the driver will then probably wish to establish the change speed transmission of the vehicle in a relatively low gear setting. This is of course done by moving the transmission controlling selector lever, not shown, to its low gear position. The power plant of the vehicle is now prepared to effect a forward movement of the vehicle accordingly the driver depresses the accelerator to open the throttle and effect a clutch engaging operation of the clutch operation power means.

Describing the latter operation with the first increment of movement of the accelerator the lever 48 is rotated counterclockwise about the pin 50 as a fulcrum, this operation being made possible by virtue of the fact that the spring 57 is weaker than the throttle spring 58 and the latter spring is strong enough to prevent the rotation of the lever 52. In this operation the lever 49 moves counterclockwise until a flange 59 at the upper end of the same contacts an adjustable stop 60 on the lever 52; and this movement of the lever 49 results in a movement of the rod 47 to the left, Figure 1, to move the valve member 30 to the right, Figure 2. This operation of the valve member 30 serves to uncover the port 43 thereby venting the control compartment 13 of the motor 8 to the atmosphere via the interior of the valve member 30.

The throttle and valve operating force transmitting linkage is also so constructed and arranged that a relatively slight continued throttle opening movement of the accelerator results in a rotation of the two levers 49 and 52 as a unit about the fixed pin 53 until a flange 62 secured to the rod 47 contacts a fixed stop 63.

When the valve member 30 is moved to the right to vent the motor compartment 13 there results a relatively rapid flow of air into said compartment; and this flow of air results in a first stage clutch engaging operation of the motor 10. Describing this operation the power element 19 of the motor 8 is moved to the right, Figure 1, by the clutch springs and when said springs have expanded sufficiently to bring the clutch plates into a certain slight engagement with each other the movement of the power element is arrested. Describing the latter operation the parts of the mechanism, including the strength of the motor spring 38, the area of the diaphragm 36, and the heretofore described linkage determining the position of the throttle when the flange 62 contacts the stop 63, are so constructed and arranged that the throttle is opened a certain slight amount as the clutch control mechanism is operated to effect this first stage of clutch engaging operation of the motor 10. In effecting this operation the vacuum developed in the compartment 51 of the valve operating motor 32 is of a certain factor said factor being such as to make possible a lapping of the valve 26.

Describing this operation when the gaseous pressure, that is degree of vacuum, within the compartment 51 reaches a certain factor then the spring 38 expands to move the valve member 28 to the right, Figure 2, to move the valve port 43 over one of the ends, that is lands, of the valve member 30. This lapping operation of the valve serves to cut off the flow of air into the motor 10 the mechanism being so constructed and so adjusted that the clutch is engaged with a certain loading for the aforementioned slight opening of the throttle. There is thus provided a clutch control mechanism for effecting a certain loading of the clutch plates as the throttle is opened slightly to get the vehicle under way; and the vehicle may be moved either forwardly or to the rear, if, for example, the driver is maneuvering the vehicle to park the same. All starts, whether to maneuver the vehicle or to maintain a forward motion of the vehicle, are made at a given manifold vacuum.

The first stage of engagement of the clutch having been completed a second stage of clutch engaging operation of the clutch control mechanism is effected by depressing the accelerator in a succession of steps. When the accelerator is depressed to increase the opening of the throttle an additional amount the lever 52 is again rotated a slight amount; and the resulting opening of the throttle effects an increase in the gaseous pressure of the intake manifold and the motor compartment 51 connected thereto. The latter operation serves to effect an expansion of the spring 38 to operate the valve 26 to effect a disengagement of the clutch; and the latter operation serves to increase the speed of the engine with a resultant increase in the vacuum within the intake manifold and the motor compartment 51 connected therewith. The latter operation serves to operate the valve 26 to energize the motor 8 to increase the engagement of the clutch thereby slowing down the engine to effect a lapping of the valve. Now the latter operations, resulting in an increase in the clutch plate loading, are effected very quickly.

A repetition of this clutch plate loading operation of the mechanism is effected by increasing the opening of the throttle; and with a succession of these throttle opening operations of the accelerator the clutch is finally completely engaged.

The clutch plates are thus first moved into engagement with each other at a fixed load, and then are more firmly pressed into contact, the latter operation being effected by a succession of steps if the driver chooses to depress the accelerator by a succession of steps; and he will probably do this if he desires to effect a slipping operation of the clutch. The latter operation is, of course, necessary in effecting a very slow movement of the car such as when parking the same. The first stage operation of the mechanism, that is the operation to effect the relatively rapid movement of the clutch plates up to a point where the said plates are slightly loaded, will, by virtue of the fact movement of the valve member 30 and its degree of its movement during its initial increment of movement of the accelerator, be effected very quickly. The second stage clutch engaging operation of my clutch control mechanism is effected more slowly.

An important feature of my invention lies in the provision of power means for insuring a certain first stage engagement of the clutch to facilitate a maneuvering of the vehicle when parking the same; for with the mechanism of my invention the driver, to get the vehicle under way at a relatively slow speed, will depress the accelerator until he feels a resistance to its movement. This resistance is encountered when the flange 62 contacts the stop 63 and the throttle return spring 58 is slightly stretched as the throttle is being slightly opened. This operation of the accelerator results in a movement of the valve member 30 to the right to effect a venting of the motor control compartment 13 to the atmosphere; and the latter operation results in effecting the aforementioned first stage of engagement of the clutch. This clutch engagement tends to decrease the speed of the engine and thereby reduce the manifold vacuum which in turn results in a lapping of the valve 28, 30.

If the engagement of the clutch is too severe as a result of the above described first stage operation of the stage clutch control mechanism of my invention, then the engagement, that is loading of the clutch plates, may be reduced by adjusting the loading of the spring 38; for said spring in large measure controls the valve lapping operation of the mechanism. It is also to be noted that with the mechanism of my invention if, perchance, the clutch should start to slip after the completion of the above described first stage operation of the mechanism, then the resulting increase in engine speed would immediately result in an increase in vacuum within the compartment 51; and this would result, through the intermediary of the operation of the valve 28, 30, in an operation of the motor 8 to effect the desired increase in clutch plate loading. The latter operation would, of course, effect a slowing down of the speed of the engine and would also effect the desired acceleration of the vehicle.

It is also to be noted that with the mechanism of my invention if the engine should labor after the first stage engagement of the clutch is completed, that there would result a disengagement of the clutch to obviate said laboring.

If desired a check valve 71 may be incorporated in the conduit 34, said valve cooperating with a restricted by-pass conduit 72 to prevent an undesirable hunting or surging operation of the valve 28, 30; and if desired the stop 63 of Figure 1 may be omitted from the clutch control mechanism of my invention thereby making the valve member 30 a control member cooperating with the valve member 28 to effect both stages of operation of the clutch control mechanism.

With the stop 63 omitted from the mechanism of my invention the first stage of engagement of the clutch is completed by taking up the above described lost motion in the throttle and valve operating linkage; thereafter a depression of the accelerator serves to initiate the second stage of operation of the mechanism said depression serving to move the valve member 30 to the right, Figure 2, thereby venting the motor 8 to the atmosphere with a resultant engagement of the clutch. The valve member 28 then moves to lap the valve when the intake manifold is decreased by the opening of the throttle. There is thus included, in the clutch control mechanism of Figure 1 with the stop 63 omitted, a power and manually operated follow-up control valve the lapping operation of the valve being effected by the operation of a manifold vacuum and spring operated motor.

Although only two embodiments of the invention have been illustrated and described, various changes in the form and relative arrangements of the parts may be made to suit requirements.

I claim:

1. A clutch control mechanism adapted to be included in the power plant of an automotive vehicle said plant including an internal combustion engine having an intake manifold, said clutch control mechanism comprising a pressure differential operated motor, a three-way valve for controlling the operation of said motor, fluid transmitting means interconnecting said valve with the intake manifold, and means for operating said valve including a single acting pressure differential and spring operated motor having its power element connected to one part of the valve, a conduit independent of the fluid transmitting means connecting the control compartment of the latter motor with the intake manifold of the engine of the vehicle, and force transmitting means interconnecting the accelerator of the vehicle with another part of said valve.

2. A clutch control mechanism adapted to be included in the power plant of an automotive vehicle said mechanism comprising a pressure differential operated motor, a control valve for controlling the operation of said motor including two relatively movable parts, and means for operating said valve including a single acting pressure differential and spring operated motor connected to one of the parts of said valve and operative to close the valve to cut off the flow of power fluid into or from the former motor, a conduit connecting the control compartment of the single acting pressure differential and spring operated motor with the intake manifold of the engine of the vehicle, said conduit being separate from the control valve and force transmitting means interconnecting the accelerator of the vehicle with the other part of said valve.

3. A clutch control mechanism adapted to be included in the power plant of an automotive vehicle including an internal combustion engine having an intake manifold and further including an accelerator; said clutch control mechanism comprising a single acting pressure differential operated motor, fluid transmitting means including a plurality of conduits interconnecting the motor with the manifold, a valve including two relatively movable parts for controlling the operation of the motor to effect a stage engagement of the clutch, and means for controlling the operation of the motor including means for effecting a clutch plate loading of a certain value upon completion of the first stage of engagement of the clutch, said control means including linkage interconnecting the accelerator with one part of the two part valve and furthermore including a pressure differential operated motor connected with the other part of the two part valve, together with another conduit interconnecting the manifold with the control compartment of the latter motor.

4. A clutch control mechanism adapted to be included in the power plant of an automotive vehicle including an internal combustion engine having an intake manifold and further including an accelerator; said clutch control mechanism comprising a single acting pressure differential operated motor, fluid transmitting means including a plurality of conduits interconnecting said motor with the manifold, a valve including two relatively movable parts for controlling the operation of the motor to effect a stage engagement of the clutch, and means for controlling the operation of the motor including means for effecting a clutch plate loading of a certain value upon completion of the first stage of engagement of the clutch, said control means including linkage interconnecting the accelerator with the one part of the two part valve, a pressure differential operated motor connected with the other part of the two part valve, and another conduit interconnecting the manifold with the control compartment of the latter motor, together with stop means for limiting the clutch engaging control movement of the valve operating linkage, said stop operating to determine the position of a part of the valve in the operation of effecting the first stage engagement of the clutch.

5. A clutch control mechanism adapted to be included in the power plant of an automotive vehicle comprising an intake manifold and an accelerator; said mechanism including a single acting pressure differential operated motor comprising a casing and a power element, a three-way valve for controlling the operation of said motor to effect a stage engagement of the clutch, a conduit interconnecting the control compartment of the latter motor with the valve, a vacuum tank, fluid transmitting means interconnecting the tank with the intake manifold, fluid transmitting means interconnecting the tank with the valve, and means for operating the valve to effect a stage operation of the motor resulting in a clutch plate loading of a certain value at the termination of the first stage of engagement of the clutch, said control means including linkage adapted to interconnect the accelerator with the valve and further including a single acting pressure differential operated motor having its power element connected with the valve, a fluid transmitting conduit, independent of the aforementioned conduit, interconnecting the control compartment of the latter motor with the manifold, a spring within said control compartment operative to bias the power element of the motor to a certain position, together with stop means for limiting the clutch engaging control movement of the valve operating linkage in the operation of effecting the first stage of engagement of the clutch.

6. A clutch control mechanism adapted to be included in the power plant of an automotive vehicle comprising a throttle, an intake manifold and an accelerator, said mechanism including a single acting pressure differential operated motor comprising a casing and a power element, a two-part three-way valve for controlling the operation of said motor to effect a stage engagement of the clutch, a conduit interconnecting the control compartment of the motor with the valve, means interconnecting the intake manifold with the valve, and means for operating the valve to effect a stage operation of the motor resulting in a clutch plate loading of a certain value at the termination of the first stage of engagement of the clutch, said control means including linkage adapted to interconnect the accelerator, the throttle, and one of the parts of the valve and further including a single acting pressure differential operated motor having its power element connected with the other part of the valve, a fluid transmitting conduit, independent of the aforementioned conduit, interconnecting the control compartment of the latter motor with the manifold, a spring within said control compartment operative to move the power element of the latter motor in a certain direction, together with stop means for limiting the clutch engaging control movement of the valve operating linkage in the operation of effecting the first stage of engagement of the clutch.

7. A clutch control mechanism adapted to be included in the power plant of an automotive vehicle comprising a throttle, an intake manifold and an accelerator, said mechanism including a single acting pressure differential operated motor comprising a casing and a power element, a two-part three-way valve for controlling the operation of said motor to effect a stage engagement of the clutch, a conduit interconnecting the control compartment of the motor with the valve, means interconnecting the intake manifold with the valve, and means for operating the valve to effect a stage operation of the motor resulting in a clutch plate loading of a certain value at the termination of the first stage of engagement of the clutch, said control means including linkage adapted to interconnect the accelerator, the throttle, and one of the parts of the valve and further including a single acting pressure differential operated motor having its power element connected with the other part of the valve, a fluid transmitting conduit, independent of the aforementioned conduit, interconnecting the control compartment of the latter motor with the manifold, and a spring within said control compartment operative to move the power element of the latter motor in a certain direction.

THOMAS H. THOMAS.

REFERENCES CITED

The following references are of record in the file of this patent:

UNITED STATES PATENTS

| Number | Name | Date |
| --- | --- | --- |
| 2,086,501 | Hill | July 6, 1937 |
| 2,152,088 | Price et al. | Mar. 28, 1939 |
| 2,184,616 | Hill | Dec. 26, 1939 |